US012553645B2

(12) United States Patent
Randolph et al.

(10) Patent No.: US 12,553,645 B2
(45) Date of Patent: Feb. 17, 2026

(54) GROUNDWATER ENHANCED GEOTHERMAL HEAT PUMP

(71) Applicant: Regents of the University of Minnesota, Minneapolis, MN (US)

(72) Inventors: Jimmy Bryan Randolph, Minneapolis, MN (US); Scott Alexander, Minneapolis, MN (US); Martin Saar, Zurich (CH)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 18/667,318

(22) Filed: May 17, 2024

(65) Prior Publication Data
US 2024/0302079 A1    Sep. 12, 2024

Related U.S. Application Data

(62) Division of application No. 17/299,363, filed as application No. PCT/US2019/064490 on Dec. 4, 2019, now abandoned.
(Continued)

(51) Int. Cl.
| F24T 10/15 | (2018.01) |
| F24T 10/00 | (2018.01) |
| F24T 10/30 | (2018.01) |

(52) U.S. Cl.
CPC .............. *F24T 10/15* (2018.05); *F24T 10/30* (2018.05); *F24T 2010/50* (2018.05); *Y02B 10/40* (2013.01); *Y02E 10/10* (2013.01)

(58) Field of Classification Search
CPC .......... Y02E 10/10; Y02B 10/40; F24T 10/00; F24T 10/10; F24T 10/13; F24T 10/15; F24T 10/17; F24T 10/30; F24T 2010/50
See application file for complete search history.

(56) References Cited

U.S. PATENT DOCUMENTS

| 882,034 A | 3/1908 | Ward |
| 2,529,062 A | 11/1950 | Williams |
| (Continued) | | |

FOREIGN PATENT DOCUMENTS

| BE | 880504 A | 4/1980 |
| CA | 3198196 A1 | 4/2022 |
| (Continued) | | |

OTHER PUBLICATIONS

Communication pursuant to Rule 164(1) EPC from European Patent Application No. 21862828.7, dated Jul. 26, 2024.
(Continued)

*Primary Examiner* — Mark A Laurenzi
*Assistant Examiner* — Xiaoting Hu
(74) *Attorney, Agent, or Firm* — Brian D. Kaul; Westman, Champlin & Koehler, P.A.

(57) ABSTRACT

A geothermal heat pump system includes a main heat exchanger, a borehole that extends in a vertical direction through an aquifer, a ground loop and a pump. The main heat exchanger is configured to exchange heat between a ground loop flow and a heat distribution system. The ground loop includes a groundwater heat exchanger, an input pipe and an output pipe. The groundwater heat exchanger is contained within the borehole and includes heat exchange piping. The input pipe delivers the ground loop flow from the main heat exchanger to the heat exchange piping. The output pipe delivers the ground loop flow from the heat exchange piping to the main heat exchanger. The pump drives a groundwater flow in a horizontal direction that is transverse to the vertical direction across the heat exchange piping. Heat exchange occurs between the ground loop flow and the groundwater flow.

21 Claims, 13 Drawing Sheets

Related U.S. Application Data

(60) Provisional application No. 62/775,089, filed on Dec. 4, 2018.

(56) References Cited

U.S. PATENT DOCUMENTS

| | | |
|---|---|---|
| 3,154,148 A | 10/1964 | Peterson |
| 3,777,502 A | 12/1973 | Michie, III et al. |
| 4,448,237 A | 5/1984 | Riley |
| 4,452,303 A | 6/1984 | Bontje et al. |
| 4,531,664 A | 7/1985 | Baski |
| 4,940,087 A | 7/1990 | Lien et al. |
| 5,379,832 A | 1/1995 | Dempsey |
| 5,590,715 A | 1/1997 | Amerman |
| 6,138,744 A | 10/2000 | Coffee |
| 7,640,974 B1 | 1/2010 | Hoeptner |
| 8,820,394 B2 | 9/2014 | Azzam |
| 9,360,236 B2 | 6/2016 | Stewart et al. |
| 9,556,856 B2 | 1/2017 | Stewart et al. |
| 10,401,057 B2 | 9/2019 | Woods |
| 2010/0288465 A1 | 11/2010 | Stewart |
| 2012/0103557 A1 | 5/2012 | Fernandez et al. |
| 2013/0300127 A1 | 11/2013 | DiNicolantonio |
| 2014/0133519 A1 | 5/2014 | Freitag |
| 2016/0084591 A1 | 3/2016 | Crook et al. |
| 2018/0172318 A1 | 6/2018 | Woods |
| 2018/0223618 A1 | 8/2018 | Waldner et al. |
| 2022/0018555 A1 | 1/2022 | Cho et al. |
| 2022/0018577 A1 | 1/2022 | Randolph et al. |

FOREIGN PATENT DOCUMENTS

| | | | | |
|---|---|---|---|---|
| CN | 2646631 | Y | | 10/2004 |
| CN | 2906418 | Y | * | 5/2007 |
| CN | 101074792 | A | | 11/2007 |
| CN | 103090594 | A | | 5/2013 |
| CN | 103388934 | A | | 11/2013 |
| CN | 206648350 | U | | 11/2017 |
| CN | 106767008 | B | | 10/2018 |
| CN | 220266534 | U | | 12/2023 |
| DE | 2931485 | A1 | | 2/1981 |
| DE | 3149636 | A1 | | 7/1983 |
| DE | 202006019801 | U1 | | 5/2007 |
| DE | 102014104992 | A1 | | 10/2015 |
| EP | 0045993 | A1 | | 2/1982 |
| EP | 0499466 | A2 | | 8/1992 |
| EP | 1084373 | B1 | | 11/2002 |
| EP | 1865146 | A1 | * | 12/2007 ......... E21B 33/1277 |
| JP | 2001145874 | A | * | 5/2001 |
| JP | 2005049016 | A | | 2/2005 |
| JP | 2009092350 | A | | 4/2009 |
| JP | 2014025688 | A | | 2/2014 |
| JP | 2014115016 | A | | 6/2014 |
| JP | 2015025612 | A | | 2/2015 |
| JP | 2015218935 | A | * | 12/2015 |
| JP | 2016070597 | A | | 5/2016 |
| JP | 2017067419 | A | * | 4/2017 |
| KR | 100759403 | B1 | * | 9/2007 |
| KR | 20090128722 | A | | 12/2009 |
| KR | 100958208 | B1 | | 5/2010 |
| KR | 101169673 | B1 | * | 8/2012 |
| KR | 20140052456 | A | | 5/2014 |
| KR | 20140062639 | A | | 5/2014 |
| KR | 101498932 | B1 | * | 3/2015 |
| KR | 20160133392 | A | | 11/2016 |
| KR | 101 733 027 | B1 | | 5/2017 |
| KR | 101792145 | B1 | | 11/2017 |
| KR | 20180043735 | A | | 4/2018 |
| KR | 101984988 | B1 | | 5/2019 |
| KR | 102505792 | B1 | | 3/2023 |
| SE | 502 610 | C2 | | 11/1995 |
| WO | 2010022354 | A1 | | 2/2010 |
| WO | 2011014521 | A1 | | 2/2011 |
| WO | 2011023311 | A2 | | 3/2011 |
| WO | 2012008992 | A1 | | 1/2012 |
| WO | 2012066403 | A1 | | 5/2012 |
| WO | 2012166650 | A1 | | 12/2012 |
| WO | 2020117946 | A1 | | 6/2020 |
| WO | 2022047163 | A1 | | 3/2022 |
| WO | 2022072343 | A1 | | 4/2022 |

OTHER PUBLICATIONS

Notification of Transmittal of the International Search Report and Written Opinion dated Mar. 13, 2020 of PCT/US2019/064490, filed Dec. 4, 2019.

General geothermal heat pump overview: Goetzler W, R Zogg, H Lisle, J Burgos (2009). Ground-Source Heat Pumps: Overview of Market Status, Barriers to Adoption, and Options for Overcoming Barriers.

Communication pursuant to Rules 161(1) and 162 EPC for corresponding European Patent Application No. 19828095.0, dated Jul. 14, 2021.

Naylor et al., "Geothermal Ground Source Heat Pumps and Geology in Indiana" Indiana Geological and Water Survey; Indiana University, publication date: Unknown. Retrieved from https://igws.indiana.edu/Geothermal/HeatPumps on May 28, 2021.

Michiya Suzuki et al. "Development of a spiral type heat exchanger for ground source heat pump system" Energy Procedia 96 (2016) 503-510; available online at www.sciencedirect.com.

Diao et al. "Heat transfer in ground heat exchangers with groundwater advection" International Journal of Thermal Sciences; vol. 43, Issue 12, Dec. 2004, pp. 1203-1211.

Casasso et al. "Efficiency of closed loop geothermal heat pumps: A sensitivity analysis" Renewable Energy vol. 62, Feb. 2014, pp. 737-746.

Stefano Lo Russo, Cesare Boffa, Massimo V. Civita, "Low-enthalpy geothermal energy: An opportunity to meet increasing energy needs and reduce CO2 and atmospheric pollutant emissions in Piemonte, Italy, Geothermics", vol. 38, Issue 2,2009, pp. 254-262, ISSN 0375-6505,https://doi.org/10.1016/j.geothermics.2008.07.005. (https://www.sciencedirect.com/science/article/pii/S037565050800045X).

Jozsef Hecht-Méndez et al. "Optimization of energy extraction for vertical closed-loop geothermal systems considering groundwater flow", Energy Conversion and Management, vol. 66, 2013, pp. 1-10, ISSN 0196-8904, https://doi.org/10.1016/j.enconman.2012.09.019. (https://www.sciencedirect.com/science/article/pii/S019689041200369X).

A. Angelotti et al. "Energy performance and thermal impact of a Borehole Heat Exchanger in a sandy aquifer: Influence of the groundwater velocity", Energy Conversion and Management, vol. 77, 2014, pp. 700-708, ISSN 0196-8904, https://doi.org/10.1016/j.enconman.2013.10.018. (https://www.sciencedirect.com/science/article/pii/S0196890413006535).

Huajun Wang et al. "Thermal performance of borehole heat exchanger under groundwater flow: A case study from Baoding", Energy and Buildings, vol. 41, Issue 12, 2009, pp. 1368-1373, ISSN 0378-7788, https://doi.org/10.1016/j.enbuild.2009.08.001. (https://www.sciencedirect.com/science/article/pii/S0378778809001820).

Nelson Molina-Giraldo et al., "A moving finite line source model to simulate borehole heat exchangers with groundwater advection", International Journal of Thermal Sciences, vol. 50, Issue 12, 2011, pp. 2506-2513, ISSN 1290-0729, https://doi.org/10.1016/j.ijthermalsci.2011.06.012. (https://www.sciencedirect.com/science/article/pii/S129007291100192X).

Funabiki, A., Oguma, M., Yabuki, T., and Kakizaki, T., 2014, "The Effects of Groundwater Flow on Vertical-Borehole Ground Source Heat Pump Systems," ASME Paper No. ESDA2014-20065.

Notification of Transmittal of the International Search Report and Written Opinion of PCT/US2021/052397, mailed Jan. 11, 2022.

Notification of Transmittal of the International Search Report and Written Opinion of PCT/US2021/047962 mailed Dec. 20, 2021.

Communication pursuant to Rules 161(2) and 162 EPC dated May 10, 2023, for corresponding European Application No. 21876293.8, 3 pages.

(56) References Cited

OTHER PUBLICATIONS

Communication pursuant to Rules 161(2) and 162 EPC dated Apr. 4, 2023, for corresponding European Application No. 21862828.7, 4 pages.
Goetzler, William, Zogg, Robert, Lisle, Heather, and Burgos, Javier. Ground-Source Heat Pumps. Overview of Market Status, Barriers to Adoption, and Options for Overcoming Barriers. United States: N. p., 2009. Web doi: 10.2172/1219308.
Notification of Transmittal of the International Search Report and Written Opinion dated Jun. 15, 2023 of PCT/US2023/015508, filed Mar. 17, 2023.
Communication pursuant to Article 94(3) EPC for European Patent Application No. 19828095.0 dated Aug. 10, 2023.
Prosecution history from corresponding U.S. Appl. No. 17/299,363, filed Jun. 3, 2021 including: Requirement for Restriction/Election mailed Jan. 27, 2023, Non-Final Rejection mailed Jun. 26, 2023, Final Rejection mailed Feb. 23, 2024; and Advisory Action mailed Apr. 29, 2024.
Extended European Search Report from European Patent Application No. 21876293.8, dated Aug. 16, 2024.
Communication pursuant to Rules 70(2) and 70a(2) EPC from European Patent Application No. 21862828.7, dated Nov. 11, 2024.
Communication pursuant to Article 94(3) EPC from European Patent Application No. 19828095.0, dated Nov. 11, 2024.
Office Action from Canadian Patent Application No. 3,121,511, dated Sep. 26, 2024.
Office Action from Canadian Patent Application No. 3,198,196, dated Sep. 25, 2024.
Office Action from Canadian Patent Application No. 3,193,648, dated Sep. 24, 2024.
Extended European Search Report from European Patent Application No. 21862828.7, dated Oct. 24, 2024.
Extended European Search Report from European Patent Application No. 25191801.7, dated Dec. 1, 2025.
Communication pursuant to Article 94(3) EPC from European Patent Application No. 21862828.7, dated Nov. 20, 2025.
Communication pursuant to Article 94(3) EPC from European Patent Application No. 19 828 095.0, dated Dec. 9, 2025.

\* cited by examiner

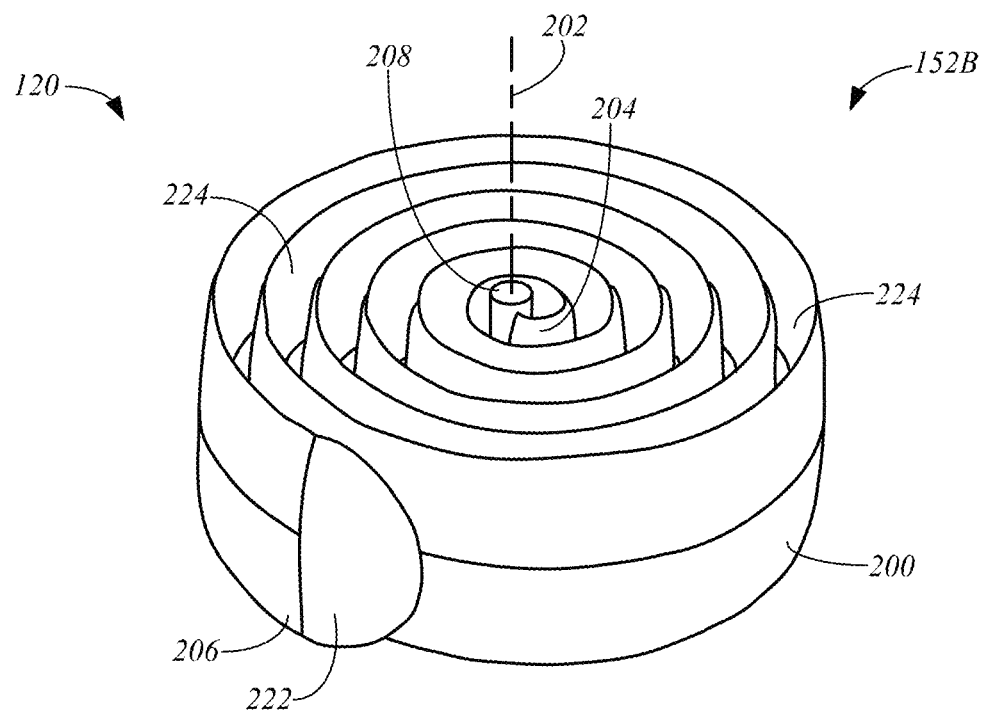
FIG. 8A
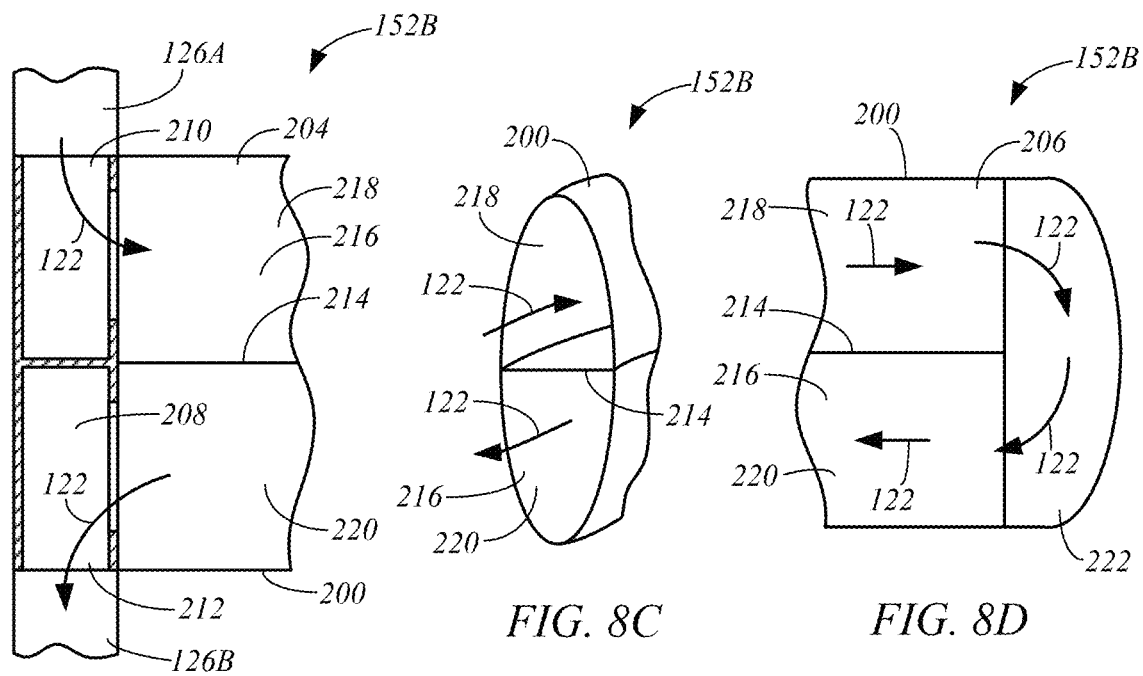
FIG. 8B
FIG. 8C
FIG. 8D

GROUNDWATER ENHANCED GEOTHERMAL HEAT PUMP

CROSS-REFERENCE TO RELATED APPLICATION

This Application is a divisional application of U.S. application Ser. No. 17/299,363 filed Jun. 3, 2021, which is a Section 371 National Stage Application of International Application No. PCT/US2019/064490, filed Dec. 4, 2019 and published as WO 2020/117946 A1 on Jun. 11, 2020, in English, which claims the benefit of U.S. Provisional Application Ser. No. 62/775,089 which was filed Dec. 4, 2018. The content of each of the above-referenced applications is hereby incorporated by reference in its entirety.

FIELD

Embodiments of the present disclosure relate to geothermal heat pump systems, geothermal heat pump system ground loops, geothermal boreholes and wells, and groundwater heat exchangers that are configured to utilize groundwater to provide and enhance heat exchange. Additional embodiments are directed to methods of using the systems, ground loops and heat exchangers.

BACKGROUND

Heat pumps generally move thermal energy from one location to another, such as moving thermal energy from a heat source to a heat sink (for example, a region of higher temperature to a region of lower temperature), or from a heat sink to a heat source (for example, a region of lower temperature to a region of higher temperature). Thus, a heat pump can provide cooling in the summer and heating in the winter. The heat pump performs a refrigeration cycle using a circulating refrigerant as the medium which moves the heat through evaporation (heat absorption) and condensation (heat rejection) phases. The evaporation and condensation phases of the refrigerant typically takes place in two different heat exchangers called the evaporator and condenser, respectively. In a heat pump, the evaporator is switched to be a condenser and vice versa depending on whether cooling or heating is required.

Geothermal or ground source heat pumps use the earth as a heat source or heat sink. A heat exchanger is positioned underground to provide cooling by using the earth as a heat sink, or to provide heating by using the earth as a heat source. The ground loops of most traditional geothermal heat pump systems focus on heat exchange with subsurface rocks and sediments, and do not systematically take advantage of heat exchange with flowing or stationary groundwater.

SUMMARY

Embodiments of the present disclosure are directed to geothermal heat pump systems having ground loops that utilize groundwater and groundwater flows to enhance heat exchange. One embodiment of a geothermal heat pump system includes a main heat exchanger, a borehole that extends in a vertical direction through an aquifer, a ground loop and a pump. The main heat exchanger is configured to exchange heat between a ground loop flow and a heat distribution system. The ground loop includes a groundwater heat exchanger, an input pipe and an output pipe. The groundwater heat exchanger is contained within the borehole and includes heat exchange piping. The input pipe is configured to deliver the ground loop flow from the main heat exchanger to the heat exchange piping. The output pipe is configured to deliver the ground loop flow from the heat exchange piping to the main heat exchanger. The pump is configured to drive a groundwater flow in a horizontal direction that is transverse to the vertical direction across the heat exchange piping Heat exchange occurs between the ground loop flow within the heat exchange piping and the groundwater flow.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIGS. 8A-8D illustrate an example of a heat exchange coil, in accordance with embodiments of the present disclosure.

DETAILED DESCRIPTION OF ILLUSTRATIVE EMBODIMENTS

Figure 1:
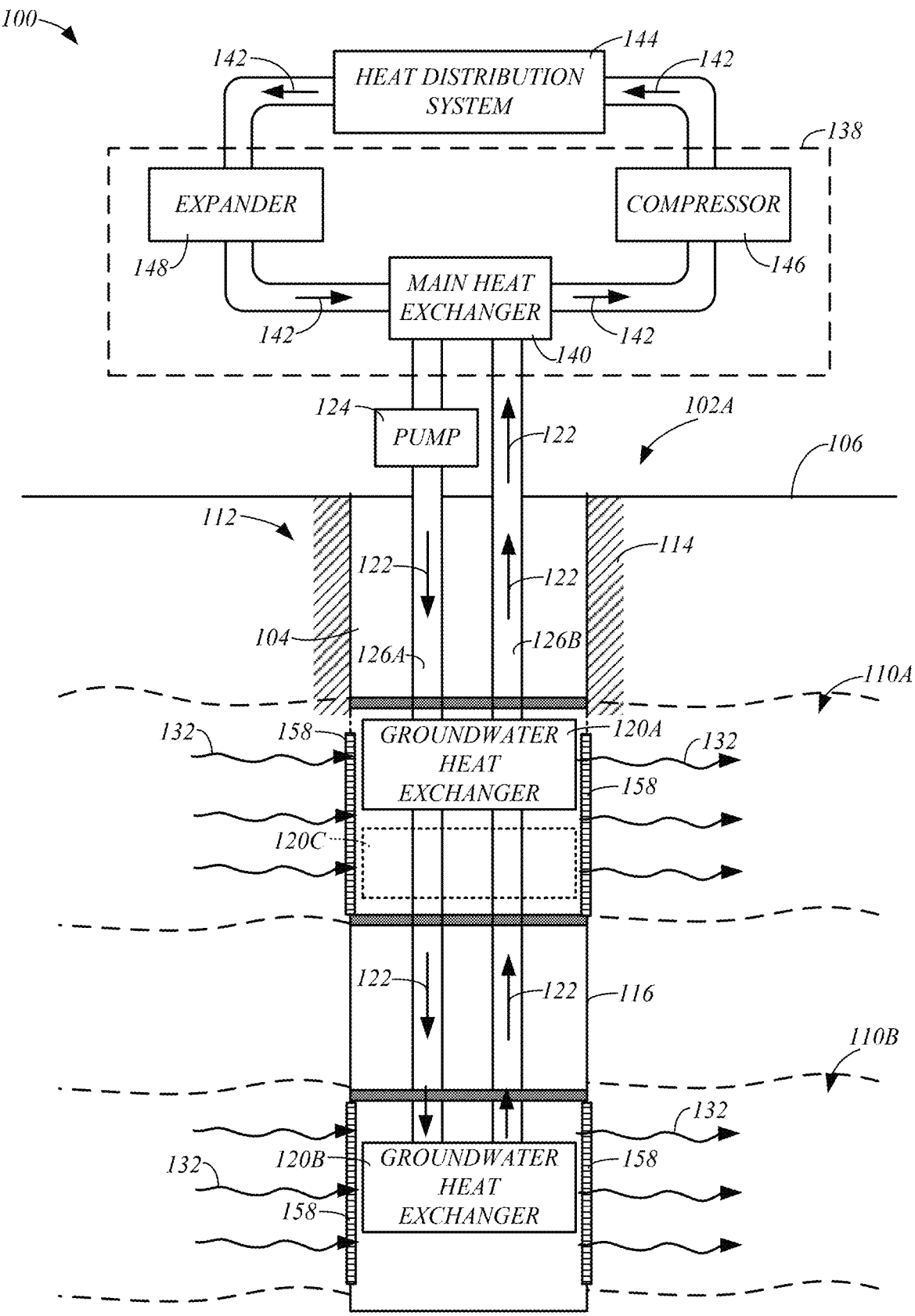
FIGS. 1-4 are simplified cross-sectional views of geothermal heat pump systems each having an exemplary ground loop installed in a vertical well or borehole, in accordance with embodiments of the present disclosure.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Specific details are given in the following description to provide a thorough understanding of the embodiments. However, it is understood by those of ordinary skill in the art that the embodiments may be practiced without these specific details. For example, conventional pumps, fluid circuitry, compressors, expanders, evaporators, heat exchangers, controllers, circuits, processors, and other conventional geothermal heat pump system components may not be shown, or may be shown in block diagram form in order to not obscure the embodiments in unnecessary detail.

Embodiments of the present disclosure relate to geothermal heat pump systems, geothermal heat pump system ground loops, and groundwater heat exchangers that are configured to utilize groundwater to provide and enhance heat exchange, such as through convective and advective heat exchange with a groundwater flow. Additional embodiments are directed to methods of using the systems, ground loops and heat exchangers. While embodiments describe the use of a groundwater flow, it is understood that embodiments of the present disclosure may generally be used to exchange heat with stagnant groundwater, naturally flowing groundwater, or a groundwater flow that is generated or supplemented by one or more devices, such as a pump, for example. As discussed below in greater detail, the ground loops may be configured for a vertical well installation or for a horizontal installation or for any variants in between.

Figure 3:
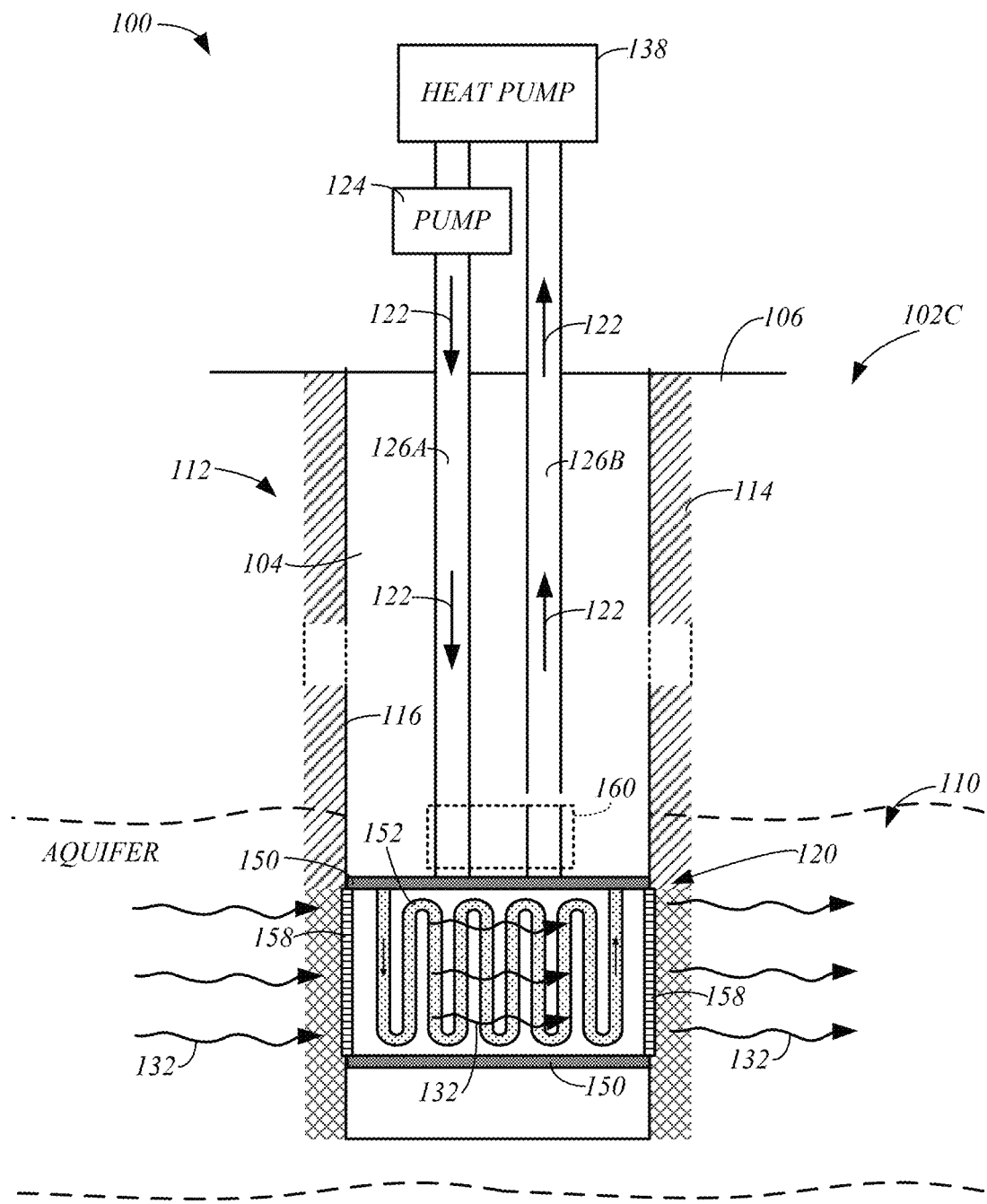
Figure 4:
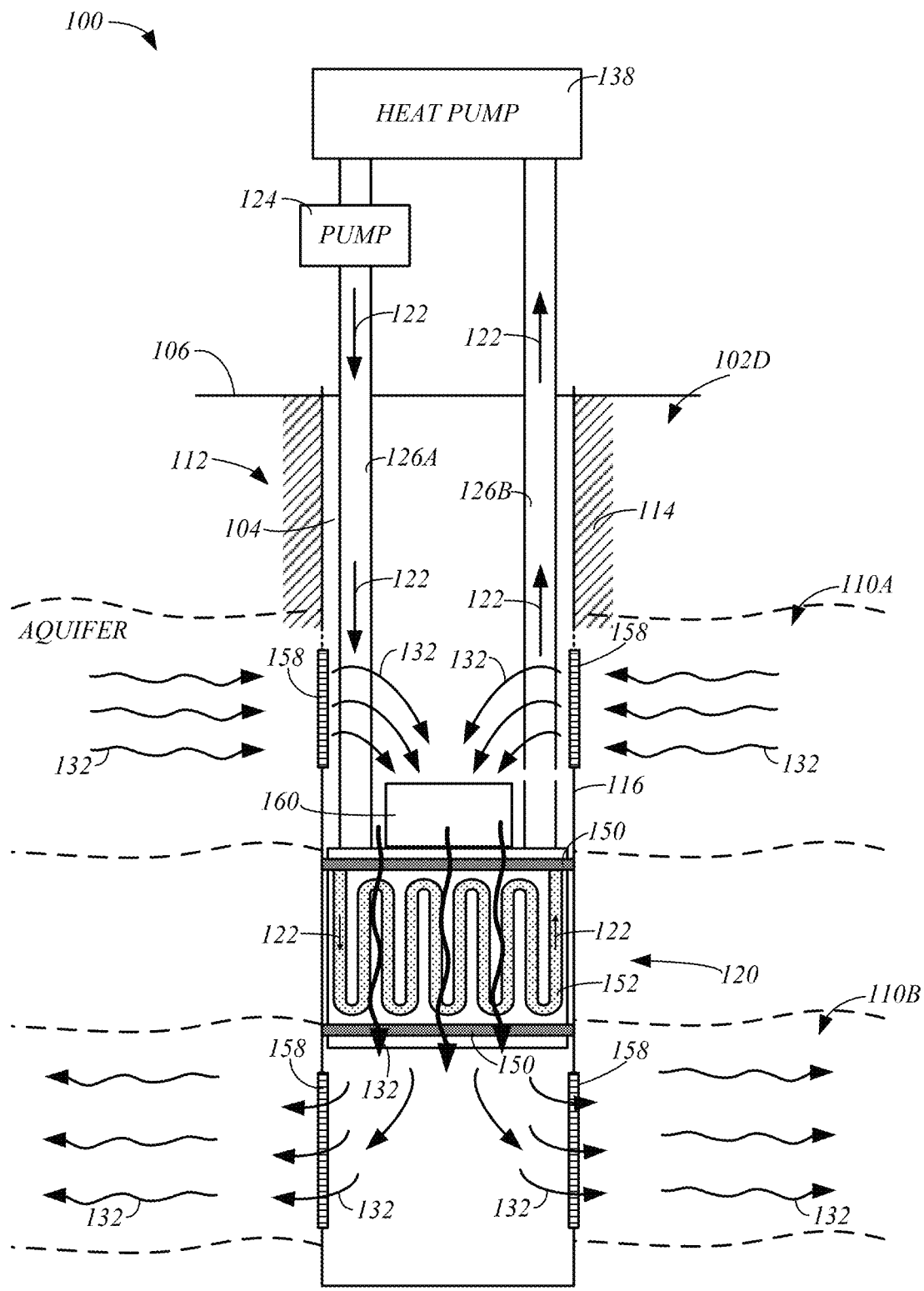
Figure 5:
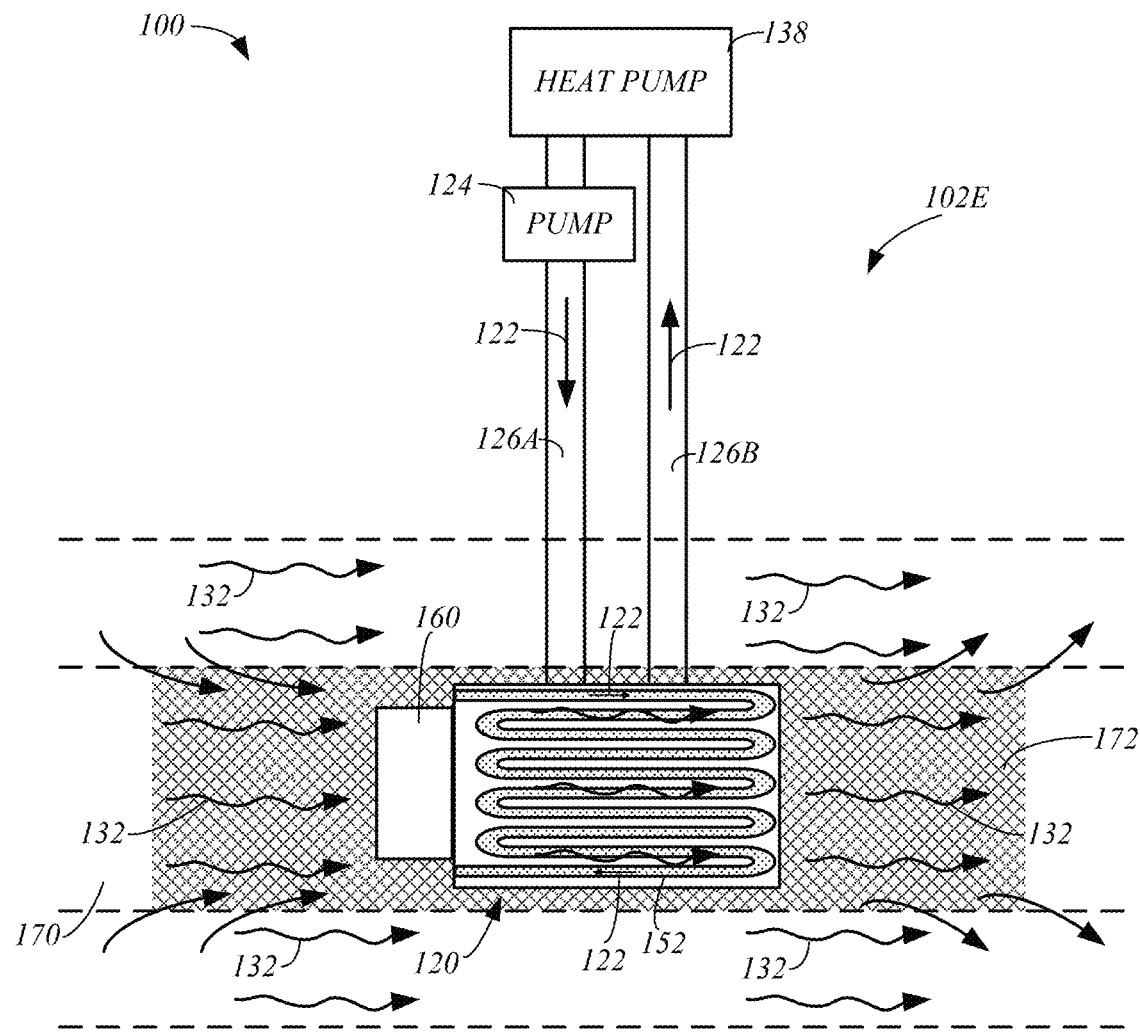
FIG. 5 is a simplified cross-sectional view of a geothermal heat pump system having an exemplary ground loop installed in a horizontal well or borehole, in accordance with embodiments of the present disclosure.

FIGS. 1-4 are simplified diagrams of geothermal heat pump systems 100 formed in accordance with one or more embodiments of the present disclosure. FIG. 5 is a simplified diagram of a geothermal heat pump system 100 having an example of a ground loop 102E installed in a horizontal configuration, in accordance with embodiments of the present disclosure.

Each of the systems 100 of FIGS. 1-4 includes a ground loop 102. Each of the ground loops 102, such as ground loop 102A (FIG. 1), ground loop 102B (FIG. 2), ground loop 102C (FIG. 3) and ground loop 102D (FIG. 4) are installed in a vertical borehole or well 104 that extends vertically below the ground 106 and penetrates one or more aquifers or aquifer or groundwater zones 110 (hereinafter "aquifer"). When a borehole is used, it may have a diameter of approximately 3-24 inches, such as 4, 6 or 8 inches, for example. If a well is used, it may be formed much larger than the borehole.

The well, pipe, drainage tile, borehole or other device 104 (hereinafter "borehole") may include sealed wall sections, such as a sealed upper section 112 (FIG. 1), to prevent groundwater from entering the section, which may increase a flow rate of the groundwater flow through selected sections of the borehole 104 where the groundwater flow is desired for heat transfer purposes. For example, the upper section 112 may be formed as a sealed wall section by encasing the section in grout 114 or other suitable material to prevent groundwater from entering the section and provide support for the wall 116 of the borehole 104.

Each ground loop 102 includes at least one groundwater heat exchanger 120 within the borehole 104 that is configured to exchange heat between a fluid flow 122 (e.g., refrigerant) that may be driven by a pump 124 through piping 126 of the ground loop 102, such as pipes 126A and 126B, and one or more groundwater flows 132, each of which may be associated with an aquifer zone. For example, the system 100 may include one or more groundwater heat exchangers 120 within the borehole 104, such as the groundwater heat exchanger 120A within the aquifer zone 110A and groundwater heat exchanger 120B within the aquifer zone 110B, of the system 100, as shown in FIG. 1.

Additionally, each aquifer zone that is penetrated by the borehole may include one or more groundwater heat exchangers. For example, the borehole 104 of the system 100 of FIG. 1 penetrates aquifer zones 110A and 110B, and the system 100 may include the groundwater heat exchanger 120A and the groundwater heat exchanger 120C (phantom lines) in the aquifer zone 110A, which are configured to exchange heat with the associated groundwater flow 132 within the aquifer zone 110A, and a groundwater heat exchanger 120B in the aquifer zone 110B, which is configured to exchange heat with the associated groundwater flow 132 within the aquifer zone 110B.

In one embodiment, the piping 126 of each ground loop 120 forms a closed loop of piping, and does not extract groundwater or carry groundwater to the surface. In another embodiment, the piping may be configured to capture subsurface groundwater into a separate pipe (not shown in the figure), and optionally return a portion of the groundwater to the surface for use (e.g., consumption).

The pipes 126A and 126B that extend below the surface 106 may be thermally insulated to reduce heat exchange with their surroundings and isolating the heat exchange with the fluid flow 122 to the one or more groundwater heat exchangers 120. Thus, rather than providing heat exchange along nearly the entire length of the borehole 104, embodiments of the system 100 provides heat exchange with the groundwater flow(s) 132 at the one or more groundwater heat exchangers 120 that are generally located within an aquifer 110 at the distal end of the borehole 104.

Each geothermal heat pump system 100 may include a heat pump 138 that includes a main heat exchanger 140 that is configured to exchange heat between a fluid flow 142 of a heat distribution system 144 and the ground loop flow 122, as indicated in FIG. 1, using any suitable technique. The heat distribution system 144 may use the fluid flow 142 to provide heating or cooling for a water heater, an HVAC, a chiller, a heat recovery chiller, or another device in accordance with conventional techniques.

The heat pump 138 may also include conventional heat pump components, such as a compressor 146, an expander 148, and/or other conventional components, to perform a desired heat pump cycle, as shown in FIG. 1. While the compressor 146 and the expander 148 are illustrated as performing a heating cycle based on the direction of the fluid flow 142, it is understood that the direction of the fluid flow 142 may be reversed to perform a cooling cycle.

The ground loops 102A-D may include packers 150 that support the one or more heat exchangers 120 within the borehole 104, but allow groundwater flow 132 to flow through the one or more heat exchangers 120. Packers 150 may also be utilized to ensure separation of aquifer zones 110 and their associated groundwater flows 132 to prevent commingling of groundwater flows 132, and to allow one or more heat exchangers 120 to be placed in a single aquifer zone 110. For example, as shown in the system of FIG. 1, packers 150 may be used to isolate the aquifer zones 110A and 110B, and their associated groundwater flows 132 from each other. This configuration can also isolate the groundwater heat exchangers 120A and 120C within the zone 110A from the groundwater heat exchanger 120B in the zone 110B. Thus, with this configuration, the groundwater heat exchangers 120A and 120C exchange heat with the groundwater flow 132 within the aquifer zone 110A, and the groundwater heat exchanger 120B exchanges heat with the groundwater flow 132 within the aquifer zone 110B.

Alternatively, it may be desirable to place the heat exchangers 120 such that there is interaction between the heat exchangers 120. For example, the heat exchangers 120A and 120B of the system 100 of FIG. 1 may be placed such that heated groundwater 132 travels from the heat exchanger 120B, which has added heat to the groundwater 132, to the next heat exchanger 120A so that this heat exchanger 120 can extract the extra heat when heating is needed, or vice versa. In this case, the system 100 does not include the aquifer isolating packers 150 described above. This design is a form of aquifer thermal energy storage.

The heat exchangers 120 may take on any suitable form. In some embodiments, each heat exchanger 120 includes heat exchange piping, tubing or one or more coils 152 (hereinafter "heat exchange coil"), as shown in FIGS. 2-5. The heat exchange coil 152 receives the fluid flow 122 from the input pipe 126A (e.g., tube, conduit, etc.). The coil 152 may be formed of copper, stainless steel, or other suitable thermally conductive material. Heat between the surrounding environment in the well 104 including the groundwater flow 132 is exchanged with the fluid flow 122 within the coil 152 before discharging the flow 122 to the output pipe 126B (e.g., tube, conduit, etc.) where it is delivered to the main heat exchanger 140 (FIG. 1) of the heat pump 138.

Figure 2:
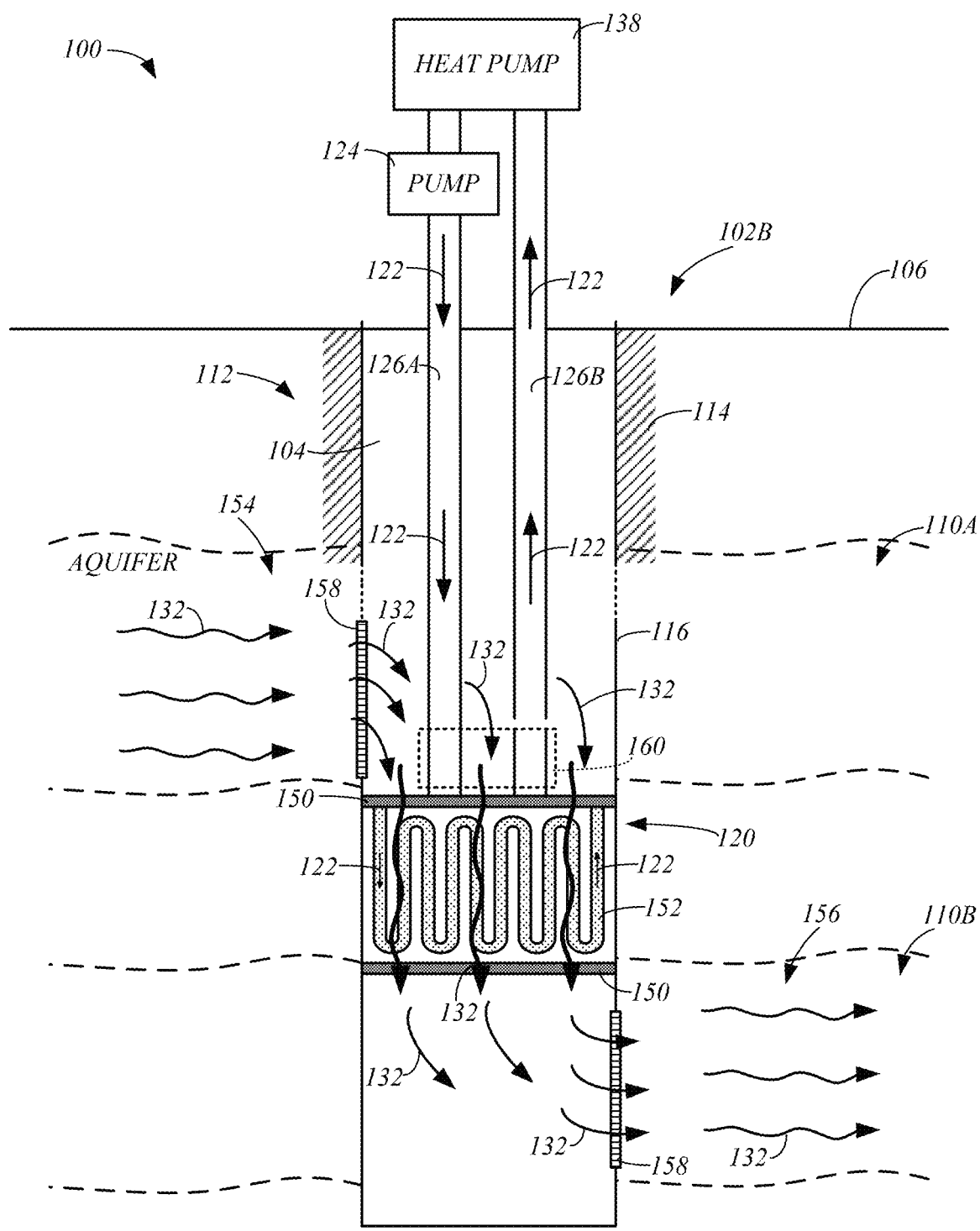

In the system 100 shown in FIG. 2, the ground loop 102B is configured to take advantage of a groundwater flow 132 from a region 154 of high hydraulic head to a region 142 of low hydraulic head 156. Such groundwater flow behavior commonly occurs, for example, in the Ironton-Galesville, St. Peter, and Platteville aquifers in Minnesota. Here, the heat exchanger 120 may be positioned between the regions 154 and 156 to take advantage of the groundwater flow 132 between the regions.

In some embodiments, the wall 116 of the borehole 104 is made more permeable to groundwater flow 132 adjacent the aquifer zones 110A and 110B to enhance the groundwater flow 132 into and out of the borehole 104, and through the corresponding heat exchangers 120. This may be accomplished by forming the wall 116 in the regions or zones 110A and 110B of a high permeability backfill, perforating the wall 116 in the zones 110A and 110B, and/or installing a screen 158 in the wall 116 in the zones 110A and 110B, for example.

Other techniques may also be used to enhance the groundwater flow 132 into and out of the borehole 104 and through the groundwater heat exchangers 120. In one embodiment, the wall 116 of the borehole 104 is sealed from the surface 106 to the bottom of the borehole 104 using grout or other suitable material as discussed above, and the zones 110 where groundwater flow is desired, such as zones 110A and 110B of the system 100 of FIG. 2, are made relatively permeable using one or more of the techniques described above.

In the example of the system 100 shown in FIG. 3, the ground loop 102C may be configured to take advantage of a groundwater flow 132 that moves laterally across the borehole 104. Such groundwater flow behavior occurs in surficial aquifers in Minnesota. Here, the heat exchanger 120 is positioned within the groundwater flow 132 for heat exchange. As discussed above, sections of the wall 116 of the borehole 104 may be sealed and/or made more permeable to enhance the groundwater flow 132 into and out of the borehole 104 and through the heat exchanger 120 (i.e., over and around heat exchange coils), using a low permeable encasing (e.g., grout 114), a high permeability backfill, perforations or a screen 158 (shown), and/or through the use of other techniques.

When the vertical (FIG. 2) or lateral (FIG. 3) groundwater flow 132 is insufficient in a given aquifer for the desired heat exchange with the heat exchanger 120, a flow generator 160 may be installed above, below or adjacent the heat exchanger 120 to drive the groundwater flow 132 through the heat exchanger 120 (i.e., across, over and around heat exchange coils 152), such as shown in the exemplary ground loop 102D of the system 100 shown in FIG. 4, which is configured similarly to the ground loop 102B of FIG. 2. This increases circulation of the groundwater flow or flows 132 through the one or more heat exchangers 120, and increases convective and/or advective heat transfer between the groundwater flow 132 and the ground loop flow 122 through the one or more coils 152 of the heat exchanger 120. This circulation of the groundwater flow 132 by the flow generator 160 is distinct from the flow 122 through the ground loop piping (e.g., pipes 126A and 126B) and the coils 152 of the heat exchanger 120, which may be driven by the pump 124 that is separate from the flow generator 160. Thus, the primary purpose of the flow generator 160 is to improve heat transfer between the groundwater flow 132 and the ground loop flow 122, rather than driving groundwater to the surface 106, for example or circulating flow through the ground loop piping.

The flow generator 160 may comprise any suitable device to increase the circulation of the groundwater flow 132 through a corresponding groundwater heat exchanger 120. The flow generator 160 may comprise low energy devices, because the heat exchanger 120 needs a relatively low flow rate of groundwater to achieve several tons of heating or cooling capacity. When used with a small-diameter borehole 104 (e.g., 3-8 inches) the flow generator 160 allows the heat exchanger 120 to access a large volume of the local groundwater flow 132 for the purpose of heat exchange. With the aid of the flow generator 160, the circulated fluid flow 122 is able to exchange heat with a volume of groundwater flow 132 that could be far greater than what would naturally be allowed within the narrow space of the borehole 104.

The flow generator 160 may comprise any suitable device or mechanism that may induce or increase convective or advective heat transfer between the groundwater flow 132 and the ground loop flow 122 within the heat exchanger 120. In some embodiments, the flow generator 160 includes a submersible pump (e.g., dipole pump), or a pump or pump motor located on the surface that drives circulation of the groundwater flow 132 through the heat exchanger 120 through a mechanical, hydraulic or other connection to the zone 110 containing the heat exchanger 120. One embodiment of the flow generator 160 may comprise a heating device that heats the groundwater below the heat exchanger 120 to generate a temperature difference within the aquifer 110 that drives the flow of the groundwater 132 through the heat exchanger 120.

In the example of the system 100 shown in FIG. 5, the ground loop 102E is in a horizontal configuration, such as through the use of a trench, drainage tile, or a horizontal borehole (hereinafter "trench") 170. As with the heat exchangers 120 of the ground loops 102A-D, the heat exchanger 120 of the ground loop 102E is submerged, fully or partially, in groundwater 132. In some embodiments, the trench 170 may be filled with a high permeability material 172 to increase the groundwater flow 132 into the trench 170, through the heat exchanger 120 (i.e., over and around heat exchange coils), and out of the trench 170.

This horizontal installation scenario could be combined, for instance, with drain tiles in fields. Such drain tiles operate to concentrate the groundwater flow 132 through the heat exchanger 120. For example, the heat exchanger 120 could be plowed into the ground using drain tile installation equipment, resulting in very cost-effective and minimally disruptive installations. Alternatively, a drain tile zone could also be accessed using directional drilling, rather than conventional methods of plowing in drain tile. In some embodiments, a flow generator 160 may be used to drive the groundwater flow 132 through the heat exchanger 120, as indicated shown in FIG. 5.

Figure 6:
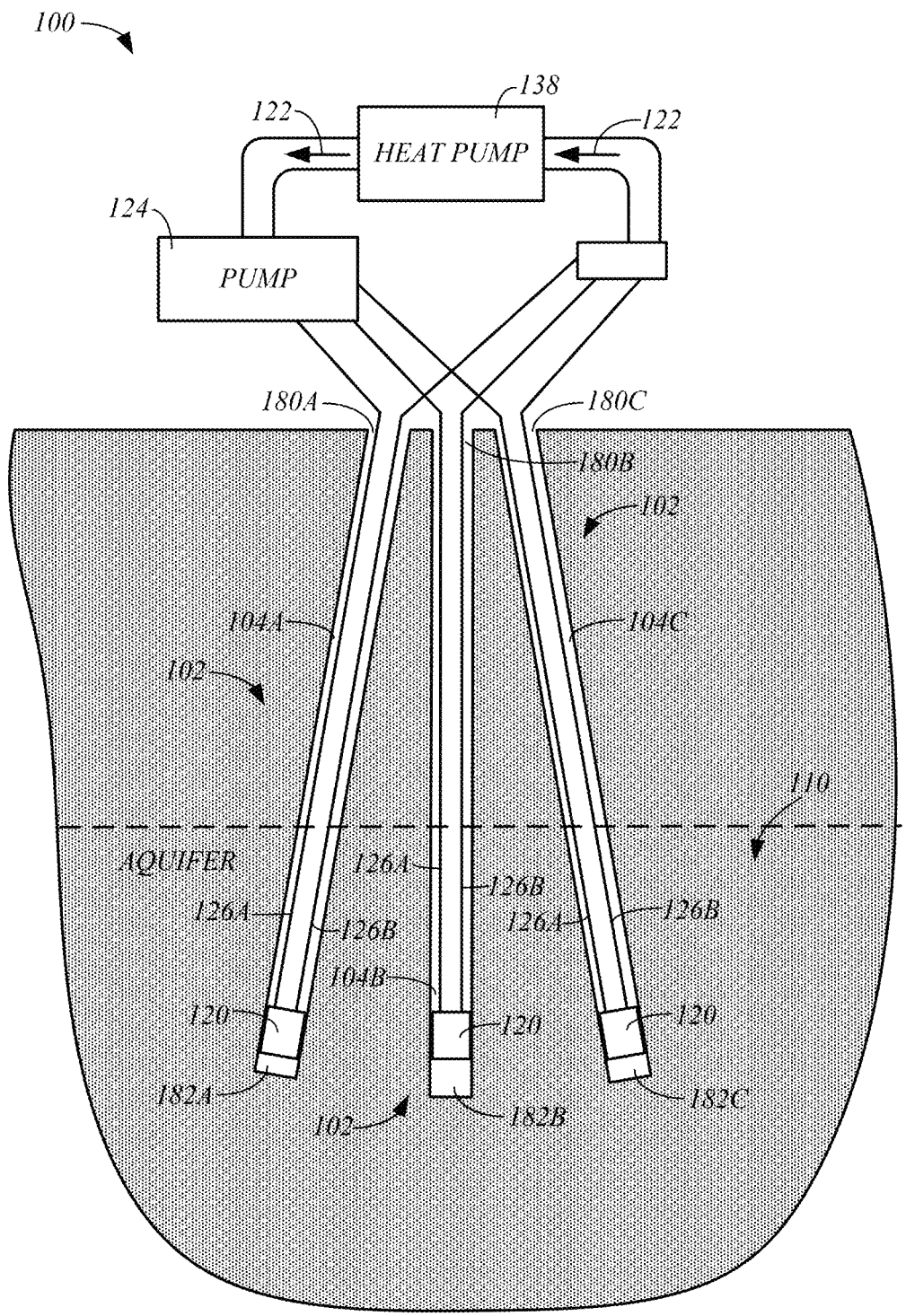
FIG. 6 is a simplified cross-sectional view of a geothermal heat pump system having exemplary ground loops installed in multiple wells or boreholes, in accordance with embodiments of the present disclosure.

The system 100 may comprise multiple boreholes 104, such as boreholes 104A-C, each penetrating an aquifer 110 and having one or more groundwater heat exchangers 120, as shown in the simplified diagram of FIG. 6. The groundwater heat exchangers 120 may each be connected to one or more main heat exchangers 140 (FIG. 1) of the heat pump 138 through ground loops 102 that may be interconnected with each other or formed as separate closed loop pipes.

The boreholes 104 each have an open surface end 180A-C at the ground surface 106 and an underground closed distal end 182A-C. In one embodiment, some of the boreholes 104 are formed at a non-perpendicular angle to the surface 106 and are oriented such that the open surface ends 180A-C of the boreholes 104 are located closer to each other than the closed distal ends 182A-C, as shown in FIG. 6. This allows the piping 126 of the system to extend from the ground surface 106 in close proximity to the main heat exchanger(s) 140 (FIG. 1) of the heat pump 138 and other surface components of the system 100, while providing a desired separation of the groundwater heat exchangers 120 and/or access to desired aquifers 110. This design allows the borehole drilling equipment to be located at or near a single point on the surface 106, resulting in less disturbance to the surface 106, and reduced installation and labor costs due to the time saved from having to significantly move the drilling equipment. Additionally, the angled boreholes 104 may provide access to parts of aquifers at depth that may not otherwise be accessible, for example, because they are under roads, buildings or other surface structures. Furthermore, having all boreholes 104 terminate at or near the same point on the surface 106 reduces the complexity of the pipes 126 needed to connect the heat exchangers 120 together and to the heat pump equipment, such as the one or more compressors 146 and expanders 148, for example.

The angled boreholes 104 of the system 100 are not suitable for conventional geothermal heat pump systems, which are optimized for heat transfer along the total length of the borehole, rather than only or primarily at a distally located heat exchanger 120. Additionally, conventional geothermal heat pump systems utilize vertical or orthogonal boreholes relative to the surface 106, rather than the angled boreholes shown in FIG. 6, to maximize the number of boreholes in a given land area.

In some embodiments, one or more flow generators 160 (FIG. 4) may be used to pump groundwater between the multiple boreholes 104 (FIG. 6), when there is low or no natural groundwater flow. In such a case, groundwater may be pumped using the one or more flow generators to circulate the groundwater through the heat exchanger within the borehole 104, then the groundwater could be pumped to an adjacent borehole where it is circulated through the corresponding heat exchanger, and so on. It would not be necessary for the groundwater to leave the borehole system in this scenario, or be exposed to the atmosphere. Thus, there would be no net extraction of water from the ground. Additionally, the boreholes could be designed such that the water never passes above the ground surface.

Embodiments of the present disclosure include the use of multiple semi-vertical or angled boreholes 104 to accomplish aquifer thermal energy storage. Here, the boreholes may be formed such that the natural groundwater flow in the aquifer system would move heat from one borehole to another borehole of the system over a period of approximately six months, or contra-seasonally, or over some other time period that is useful for a particular application. In such a system, heat that is added to the aquifer in one, upgradient borehole during the cooling season can be extracted from the aquifer from a second borehole during the heating season.

Embodiments of the present disclosure also can provide for thermal energy storage by moving groundwater and heat between vertically separated sections of one or more aquifers within a single or multiple boreholes, then reversing the flow contra-seasonally or when energy is needed.

Embodiments of the present disclosure also include the use of hybrid systems, such as solar thermal—geothermal systems. In this case, the non-geothermal heat energy sources or sinks can add or remove heat to the geothermal system to enhance the performance of the overall heating and cooling system and to balance heating and cooling loads.

The vertical boreholes 104 may be formed using an old water supply well or a dual-purpose well. Old water supply wells (or any other type of bore into/through a groundwater bearing unit) could be repurposed to include a ground loop 102 and, therefore, used for heat exchange rather than water supply (or fluid injection/disposal). Old wells may pass through several distinct aquifers, each of which could be used for heat exchange (as could be done with wells drilled exclusively for the ground loops 102). Sections of the wells 104 may be isolated using suitable packers 150 (FIG. 2) to ensure that groundwater is not exchanged between separate aquifer zones. In this way, embodiments of the ground loops 102 could help improve local water quality and eliminate one of the big issues facing local water authorities—interaquifer exchange.

Dual-purpose wells may be used to provide both potable and/or process water and the heat exchange capacity for heating/cooling. In such a well, a potable water pump may be installed in the water column, such as above the location of the heat exchanger 120 or another location. The pipes 126 of the ground loop 102 of the system 100 may extend to the surface past the potable water pump. Such a borehole 104 may utilize a secondary, flow generator 160 associated with the heat exchanger to induce and/or enhance flow through the reservoir and across the exchanger, as described above.

Borehole convection wells having any significant diameter (e.g., greater than 5 cm diameter) will experience natural convection within the borehole. This natural convection can be enhanced with two heat exchangers 120, such as the heat exchangers 120A and 120C shown in FIG. 1. For heating demand, the fluid flow 122 returning from the heat exchanger 120C is colder and can be transferred to the second exchanger 120A toward the top of the water table within the borehole 104. The cooler water will mix downward, driving convection and drawing in heat from the length of the borehole. For cooling demand, the heat exchanger 120B at the bottom of the borehole will allow heated water to mix upwards. In some embodiments, this system is used in a short open-hole or screened interval and a large saturated, but cased borehole. Heat exchange could occur along the full length of the saturated thickness. Alternatively, the open hole could be enlarged by blasting and bailing to produce a larger diameter chamber with a single heat exchanger 120 driving convective heat exchange across the entire surface area of the open interval.

The ground loops 102 described above provide several advantages over traditional geothermal heat pump ground loops. For example, because the ground loops 102 require fewer wells/boreholes 104 than traditional systems due to the high heat transfer between the groundwater flow 132 and the heat exchanger(s) 120, the amount of space needed for the ground loops 102 is far less than traditional ground loops. Thus, the systems 100 can be installed at sites that wouldn't otherwise have sufficient space, and larger systems 100 (e.g., multiple borehole systems) can be installed in a given space than would be possible with traditional geothermal heat pumps.

Additionally, embodiments of the heat exchanger 120 allow it to be serviced, removed, and/or replaced after the initial installation. In comparison, the subsurface exchange loops in traditional ground loops are installed such that they can never be serviced. When they break or degrade, entirely new loops must be installed, which is a costly endeavor. At the end of the lifespan of traditional ground loops subsurface equipment, new loops may need to be installed, or the ground system may have been over or under thermally saturated. However, in the disclosed embodiments, maintenance or replacement of the groundwater heat exchanger is a straightforward operation, requiring no new drilling or trenching, thus significantly decreasing operation, maintenance, and replacement costs.

The disclosed embodiments also reduce pumping energy requirements. For example, some embodiments of the disclosed ground loops use a small fraction of the length of piping and associated volume of fluid that is required with traditional ground loops to achieve a given amount of heat exchange. Thus, the power needed to circulate the ground loop flow is reduced, as is wear on the pumps themselves. With lower pumping power, the overall coefficient of performance of the system 100 is better than traditional geothermal heat pump systems. Moreover, with lower frictional losses from pipe length, smaller diameter pipes can be used, decreasing overall system cost, while improving heat transfer properties.

The disclosed embodiments also may not need an antifreeze, such as a glycol mixture, in the ground loop flow 122, something required in traditional geothermal systems, because groundwater generally always exceeds freezing temperature. Rather than antifreeze, water can be used in the ground loop piping. Water is less expensive, less toxic, and less energy intensive to pump than antifreeze. If water is used in the ground loop piping, certain additives may need to be added to the water, such as to prevent biological activity.

FIGS. 7-13 illustrate examples of heat exchange coils 152 of a heat exchanger 120, in accordance with embodiments of the present disclosure. Each of the coils 152 includes an interior fluid pathway and ends 184 and 186 that connect to the pipes and allow for the fluid flow to travel through the interior fluid pathway of the coil 152. The coils 152 may be formed of a thermally conductive material, such as a metal, such as copper, stainless steel, or other suitable material, to facilitate heat transfer from the ground loop flow 122 to the groundwater flow 132 within the borehole 104.

Figure 7A:
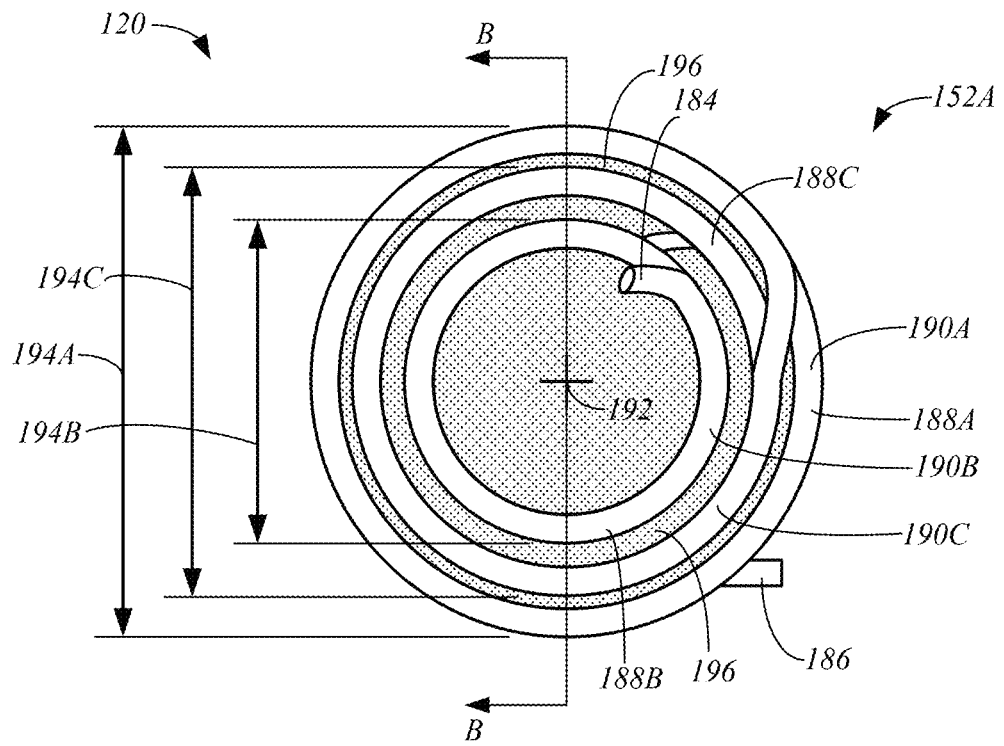
FIGS. 7A and 7B are top and side cross-sectional views of an example of a heat exchange coil, in accordance with embodiments of the present disclosure.
Figure 7B:
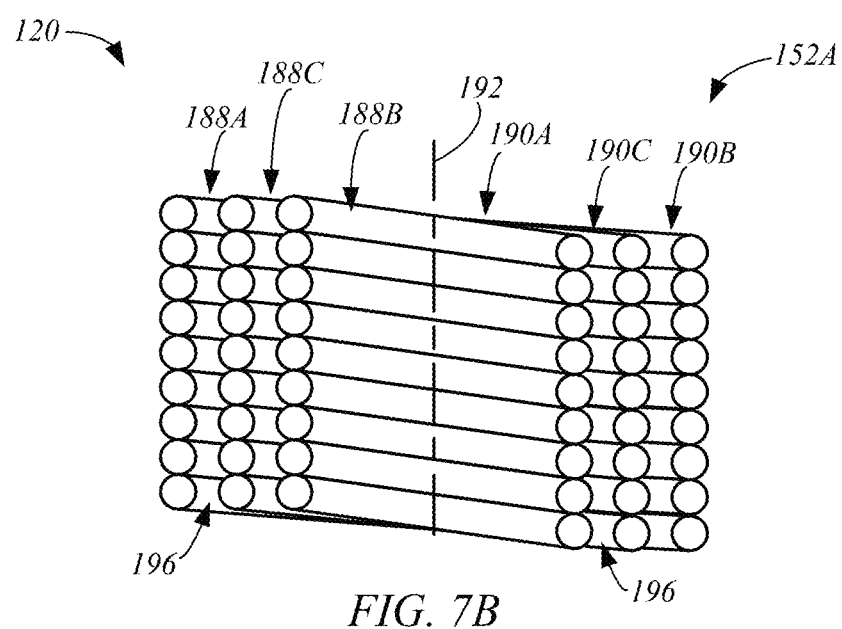

FIGS. 7A and 7B are top and side cross-sectional views of a heat exchange coil 152A, in accordance with embodiments of the present disclosure. The coil 152A includes a plurality of nested stacked coils 188, such as stacked coils 188A-C. Other configurations of the coil 152A include a pair of stacked coils and more than three stacked coils. Each of the stacked coils 188 includes a coil section 190 that surrounds or is coiled around a central axis 192 and has a different diameter 194 than the other stacked coils 188. In one embodiment, each coil section 190 is substantially concentric to the central axis 192.

In the example shown in FIGS. 7A and 7B, the coil 152A includes an outer stacked coil 188A having a coil section 190A that is coiled around and substantially concentric to the axis 192 and has a diameter 194A, an inner stacked coil 188B having a coil section 190B that is coiled around and substantially concentric to the axis 192 and has a diameter 194B, and a middle stacked coil 188C having a coil section 190C that is coiled around and substantially concentric to the axis 192 and has a diameter 194C, which is between the diameters 194A and 194B. Gaps 196 may be formed between the stacked coils 188 to allow for the passage of the groundwater flow 132 and improved heat transfer therewith.

The diameter of the outer stacked coil 188A may be set to allow the coil 152A to be inserted into the borehole 104 in which it is to be used. In some embodiments, the outer diameter 194A of the outer stacked coil 188A is less than 4 inches to allow it to be inserted within a 4-inch borehole. However, in some embodiments, the coil 152A may be radially compressible relative to the axis 192. This allows the coil 152A to have an expanded state, in which the diameter 194A of the outer stacked coil 188A is greater than the diameter of the borehole in which it is to be used, and a compressed state that allows the coil 152A to be installed within the borehole 104. The coils can be designed to be recompressed downhole for later removal if required.

FIGS. 8A-8D illustrate a heat exchange coil 152B, in accordance with embodiments of the present disclosure. FIG. 8A is a simplified isometric view of the coil 152B, and FIGS. 8B-D are simplified cross-sectional views of portions of the coil 152B. The coil 152B includes a coil body 200 formed of a thermally conductive material (e.g., copper, stainless steel, etc.) that is spiraled around a central axis 202. An interior end 204 of the coil body 200 is proximate the central axis 202, and an outer end 206 of the coil body 200 is radially displaced from the central axis 202 a greater distance than the interior end 204. The interior end 204 of the coil body 200 may be connected to a central hub 208 having a port 210 and a port 212, which may be respectively connected to the pipes 126A and 126B for receiving the ground loop flow 122. The coil body 200 may be flattened such that a dimension along the central axis 202 is substantially greater (e.g., more than 50% greater) than a dimension along an axis that is perpendicular to the central axis 202.

The coil body 200 may include a divider wall 214 that divides an interior cavity 216 of the coil body 200 into an upper fluid pathway 218 and a lower fluid pathway 220, as shown in FIGS. 8B-D. The interior end 204 of the upper pathway 218 is connected to the port 210 and the interior end 204 of the lower pathway 220 is connected to the port 212, as shown in FIG. 8B. The outer end 206 of the coil body 200 includes a cap 222 that fluidically connects the upper and lower fluid pathways 218 and 220, as shown in FIG. 8D. Thus, the ground loop flow 122 in the pipe 126A is received by the upper fluid pathway 218 through the port 210, and the flow 122 travels through the upper fluid pathway 218 to the outer end 206 where it is passed to the lower fluid pathway 220 through the cap 222, as illustrated in FIGS. 8B-D. The flow 122 is then returned to the interior end 204 through the lower fluid pathway 220 where it is discharged through the port 212 to the pipe 126B, as indicated in FIG. 8B.

Gaps 224 between spirals of the coil body 200, allow the groundwater flow 132 to travel along the central axis 202 and over the surfaces of the coil body 200. Heat energy is exchanged between the ground loop flow 122 traveling through the upper and lower fluid pathways 218 and 220 and the groundwater flow 132. The flattened shape of the coil body 200 enhances this heat transfer by exposing a large surface area of the coil body 200 to the groundwater flow 132, while reducing resistance to the groundwater flow.

Figure 9:
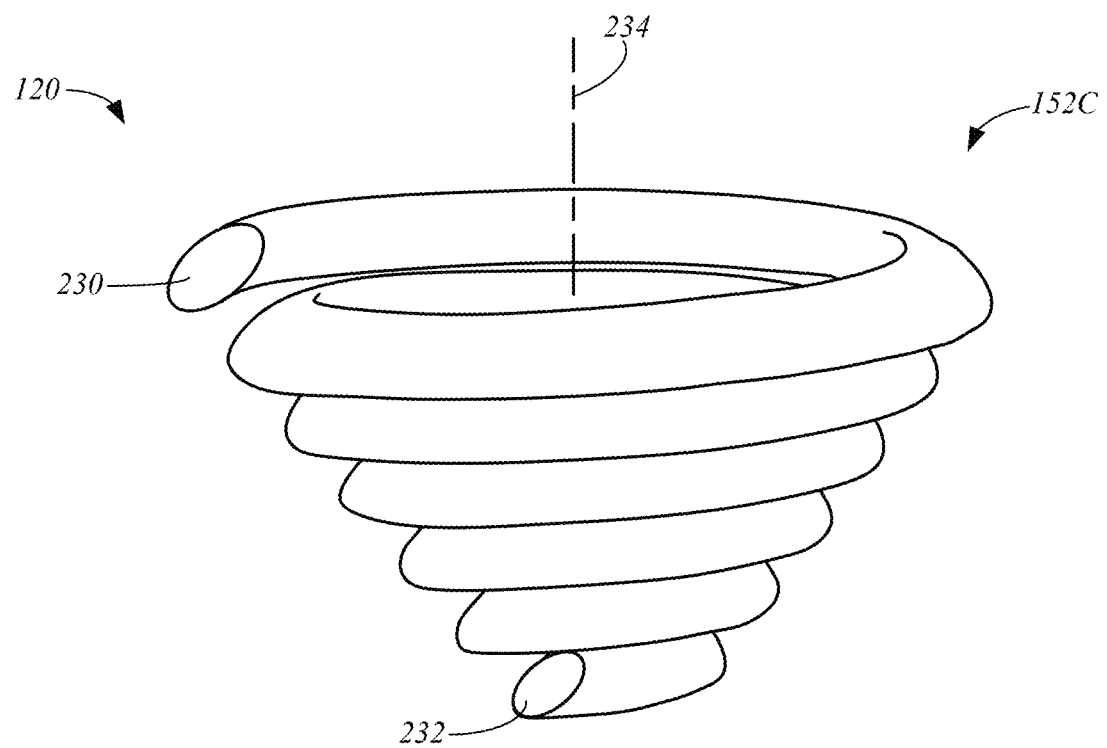
FIG. 9 is an isometric view of an example of a heat exchange coil, in accordance with embodiments of the present disclosure.

FIG. 9 is an isometric view of exemplary heat exchange coil 152C, in accordance with embodiments of the present disclosure. The coil 152C is in the form of a conical spiral coil having ends 230 and 232 that may connect to the pipes 126A and 126B (FIG. 1) of the system 100. A fluid pathway within the coil 152C allows the ground loop flow 122 to travel between the ends 230 and 232. The end 230 is radially displaced a greater distance from a central axis 234 than the end 232. Additionally, the ends 230 and 232 are displaced from each other along the axis 234. This design forces the groundwater flow 132 across the extent of the conical spiral coil 152C, while reducing the interference from one loop of the coil 152C to the next.

Figure 10:
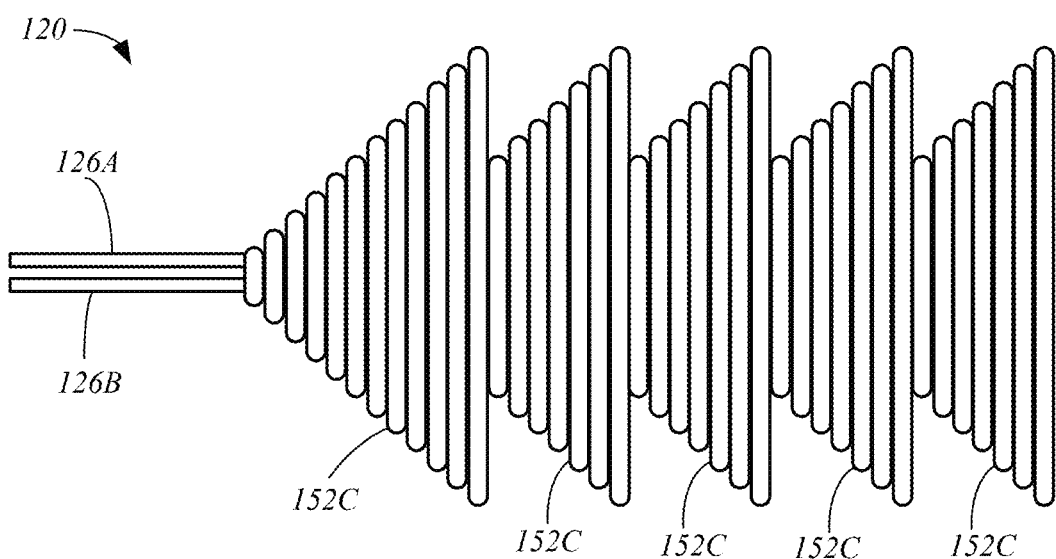
FIG. 10 is a side view of an example of a nested group of heat exchange coils, in accordance with embodiments of the present disclosure.

Each of the heat exchange coils 152 described above may be nested to provide a desired heat exchange rate for the heat exchanger 120. For example, the conical coils 152C may be nested together, such as shown in FIG. 10 for increased heat exchange.

Figure 11A:
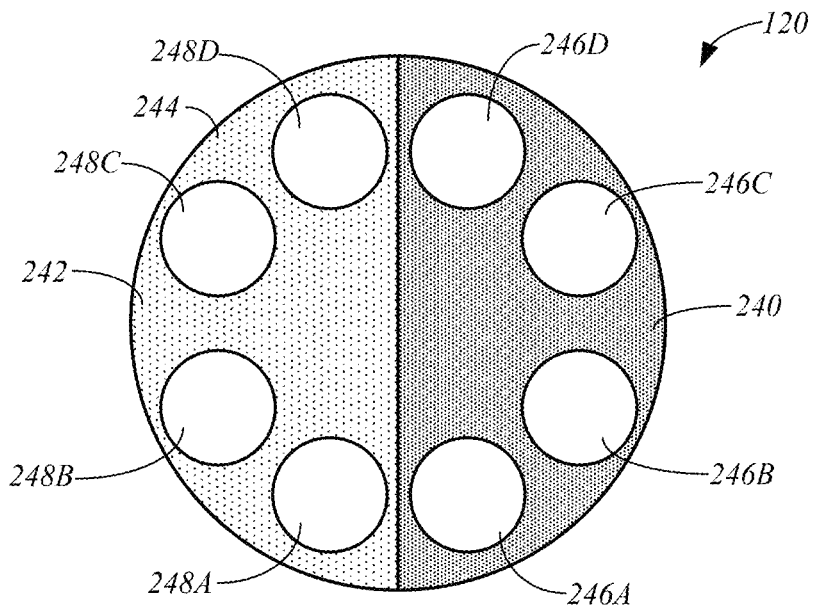
FIGS. 11A and 11B are simplified top and side views of an example of a groundwater heat exchanger, in accordance with embodiments of the present disclosure.
Figure 11B:
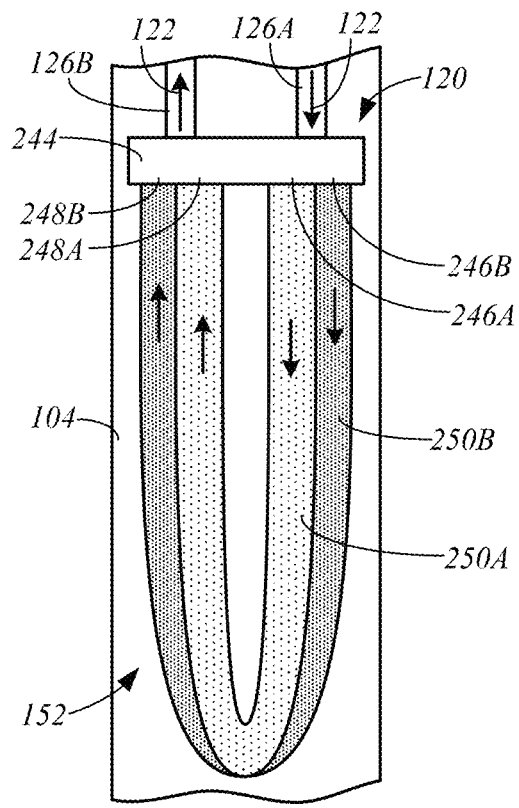

FIGS. 11A and 11B are simplified top and side views of an example of a groundwater heat exchanger 120, in accordance with embodiments of the present disclosure. The groundwater heat exchanger 120 includes an input manifold 240 and an output manifold 242, which are respectively configured to connect to the input and output pipes 126A and 126B. The input and output manifolds 240 and 242 may be separate components, or integrated into a manifold body 244, as shown in FIG. 11A. The manifold body 244 may be sized to be received within the borehole 104, in which it is to operate, as shown in FIG. 11B. In one example, the manifold body 244 may have an outside diameter of 5.5 inches or less.

The input manifold 240 includes a plurality of input ports 246, such as input ports 246A-D, and the output manifold 242 includes a plurality of output ports 248, such as output ports 248A-D. In some embodiments, the input and output manifolds 240 and 242 accommodate two or more pairs of input and output ports, such as four pairs of input and output ports, as shown in FIG. 11A.

Heat exchange tubes 250 connect the input ports to corresponding output ports, as shown in FIG. 11B. For example, a tube 250A may connect the input port 246A to the output port 248A, and a tube 250B may connect the input port 246B to the output port 248B. Each tube 250 may be formed of a thermally conductive material (e.g., copper, stainless steel, etc.) and may be configured in any desirable shape, such as a coil.

During operation, the ground loop flow 122 is received by the input manifold 240 from the pipe 126A and delivered to each of the input ports 246. Each tube 250 delivers a portion of the ground loop flow 122 to the corresponding output ports 248 of the output manifold 242, from which the flow 122 is transferred to the output pipe 126B. The groundwater fluid flow 132 is configured to travel over and around the tubes 250 during which heat energy is transferred from the portions of the ground loop flow 122 traveling through the tubes 250 to the groundwater flow 132.

Figure 12:
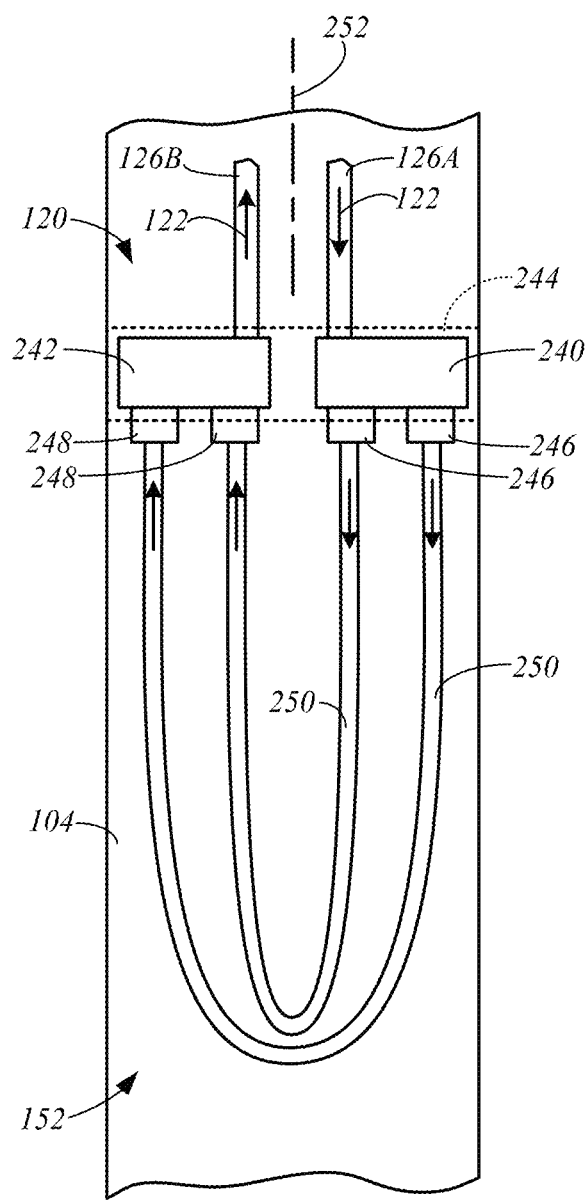
FIGS. 12 and 13 are simplified side views of additional examples of heat exchangers, in accordance with embodiments of the present disclosure.
Figure 13:
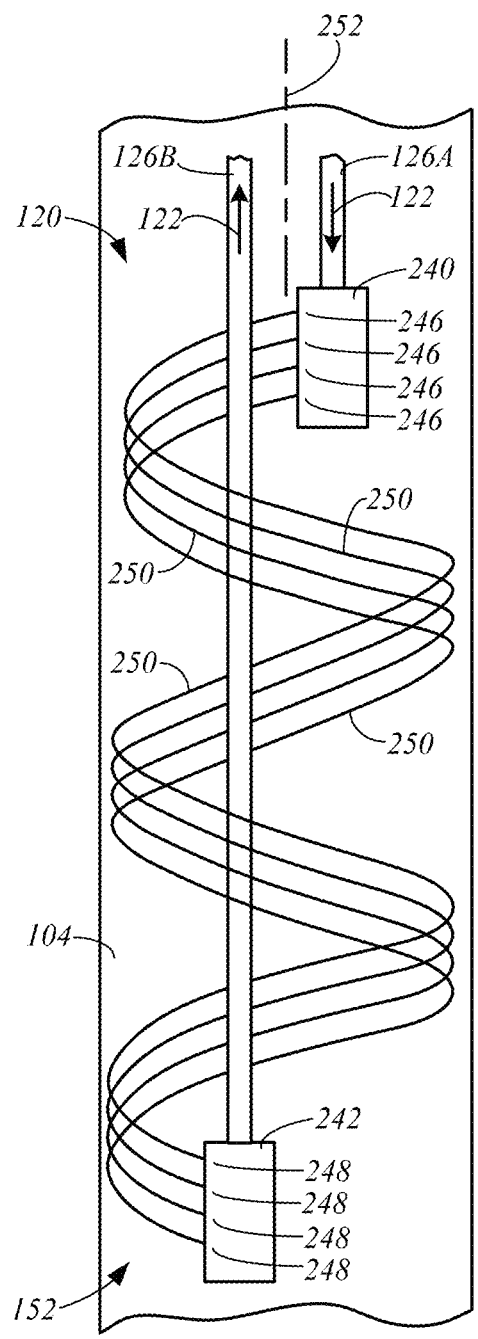

FIGS. 12 and 13 are simplified side views of additional examples of heat exchangers 120, in accordance with embodiments of the present disclosure. The illustrated heat exchangers 120 include similar features to the heat exchanger 120 of FIGS. 11A-B, including input and output manifolds 240 and 242 that may be connected to the input and output pipes 126A and 126B of the system 100. Each input manifold 240 includes a plurality of input ports 246, and each output manifold 242 includes a plurality of output ports 248. Heat exchange tubes 250 connect pairs of the input and output ports together.

In operation, the input manifolds 240 of the heat exchangers 120 of FIGS. 12 and 13 receive the ground loop flow 122 from the input pipe 126A and deliver portions of the ground loop flow 122 to the heat exchange tubes 250 through the input ports 246. The output manifolds 242 receive the portions of the flow 122 from the tubes 250 through the output ports 248 and deliver the flow 122 to the output pipe 126B. Heat exchange occurs between the portions of the groundwater flows 132 traveling over and around the tubes 250 and the ground loop flow 122 in the tubes 250.

The input and output manifolds 240 and 242 of the heat exchangers 120 may be located adjacent each other, as shown in FIG. 12, or displaced from each other along an axis 252 of the borehole 104 such that the input manifold 240 is at a higher elevation than the output manifold 242. However, it is understood that the ground loop flow 122 may be reversed from that indicated by the arrows in FIG. 13, effectively changing the locations of the input and output manifolds 240 and 242. The input and output manifolds 240 and 242 may also be joined together using a suitable manifold body 244, which is shown in phantom lines in FIG. 12.

The heat exchange tubes 250 may take on various forms. In some embodiments, the heat exchange tubes 250 have a cross-sectional shape and/or features that facilitate efficient heat exchange between the ground loop flow 122, or portion thereof, flowing through the tubes 250 and the groundwater flow 132, in which the heat exchanger 120 is placed. In some embodiments, the heat exchange tubes 250 have non-circular cross-sectional shapes.

Figure 14A:
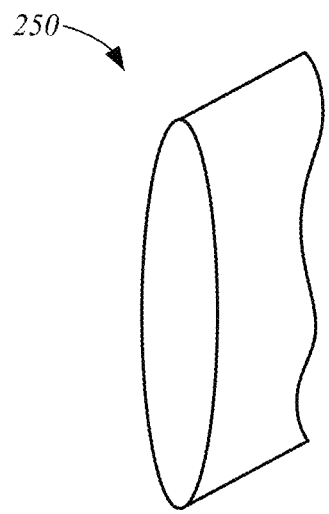
FIGS. 14A and 14B are simplified isometric cross-sectional views of examples of heat exchange tubes, in accordance with embodiments of the present disclosure.
Figure 14B:
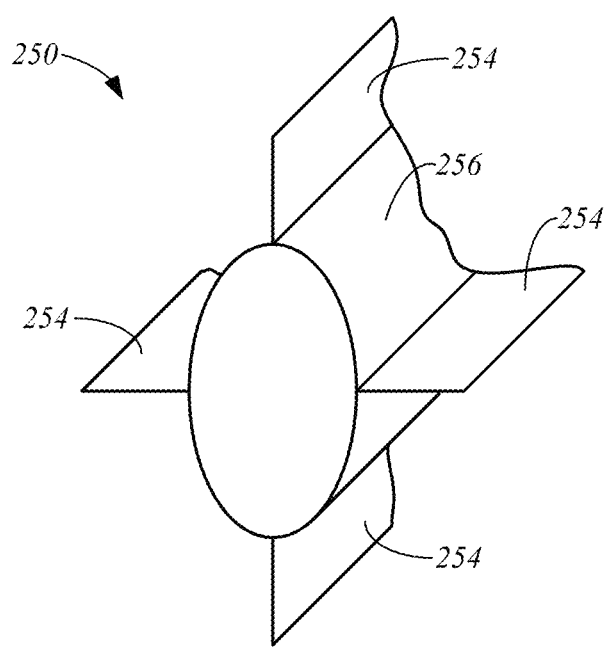

Examples of non-circular tubes 250 are shown in the cross-sectional views provided in FIGS. 14A and 14B. In one embodiment, the heat exchange tubes 250 have a flattened or oval cross-section, as shown in FIG. 14A, which may be used to increase the surface area of the tubing that may be exposed to the groundwater flow 132. In one embodiment, the heat exchange tubes 250 include one or more heat-conducting fins 254 that extend from an exterior surface 256 of the tubing, as shown in FIG. 14B. Additional options for the tubes include a combination of the features shown in FIGS. 14A-B, such as internal and external enhancements to the tubes. These enhancements include external fins, external surface area enhancement, internal surface area enhancement, and turbulators.

The length of each heat exchange tube 250 may be chosen to provide the desired rate of heat transfer between the portions of the ground loop fluid flow 122 traveling through the tube 250 and the groundwater flow 132, in which the tube 250 is placed. In some embodiments, the tubes 250 may have a length of 2-10 feet, such as six feet, for example. The heat exchange tubes 250 may also be coiled, as shown in FIG. 13 to pack a greater length of the tubes 250 per unit length along the axis of the borehole 104. The length of each heat exchange tube 250 may also be chosen to provide the desired ground loop fluid pressure drop through the tube and overall ground loop. The widths of each tube 250 may also vary.

Although the embodiments of the present disclosure have been described with reference to preferred embodiments, workers skilled in the art will recognize that changes may be made in form and detail without departing from the spirit and scope of the present disclosure.

What is claimed is:

1. A geothermal heat pump system comprising:
   a main heat exchanger configured to exchange heat between a ground loop flow and a heat distribution system;
   a borehole that extends in a vertical direction through an aquifer;
   a ground loop comprising:
      a groundwater heat exchanger contained within the borehole and including heat exchange piping;
      an input pipe configured to deliver the ground loop flow from the main heat exchanger to the heat exchange piping; and
      an output pipe configured to deliver the ground loop flow from the heat exchange piping to the main heat exchanger; and
   a pump located in the borehole configured to drive a groundwater flow in the borehole in a horizontal direction that is transverse to the vertical direction across the heat exchange piping,
      wherein heat exchange occurs between the ground loop flow within the heat exchange piping and the groundwater flow.

2. The system according to claim 1, wherein the groundwater heat exchanger is positioned within the aquifer.

3. The system according to claim 2, wherein the borehole comprises:
   a sealed wall section that blocks the groundwater flow into the borehole;
   a first permeable wall section located within the aquifer; and
   a second permeable wall section located within the aquifer on an opposing side of the borehole from the first permeable wall section and displaced from the first permeable wall section in the horizontal direction,
   wherein the pump drives the groundwater flow into the borehole through the first permeable wall section and out of the borehole through the second permeable wall section.

4. The system according to claim 3, wherein the first and second permeable wall sections each include a screen.

5. The system according to claim 3, further comprising:
   a first packer positioned above the groundwater heat exchanger within the borehole; and
   a second packer positioned below the groundwater heat exchanger within the borehole,
   wherein the first and second packers isolate the groundwater flow in the borehole to a section of the borehole that is between the first and second packers.

6. The system according to claim 5, wherein the first and second packers isolate the groundwater flow to the aquifer and through the groundwater heat exchanger.

7. The system according to claim 6, wherein:
   the groundwater heat exchanger is a first groundwater heat exchanger;
   the aquifer is a first aquifer located at a first zone of the borehole;
   the pump is a first pump;
   the groundwater flow is a first groundwater flow; and
   the system further comprises:
      a second groundwater heat exchanger including heat exchange piping that receives the ground loop flow and positioned within a second aquifer located at a second zone of the borehole that is displaced in the vertical direction from the first aquifer; and
      a second pump located in the borehole configured to drive a second groundwater flow in the borehole in the horizontal direction across the heat exchange piping of the second groundwater heat exchanger,
   wherein heat exchange occurs between the ground loop flow within the heat exchange piping of the second groundwater heat exchanger and the second groundwater flow.

8. The system according to claim 7, wherein the borehole comprises:
   a third permeable wall section located within the second aquifer; and
   a fourth permeable wall section located within the second aquifer on an opposing side of the borehole from the third permeable wall section and displaced from the third permeable wall section in the horizontal direction,
   wherein the second pump drives the second groundwater flow into the borehole through the third permeable wall section and out of the borehole through the fourth permeable wall section.

9. The system according to claim 8, wherein the third and fourth permeable wall sections each include a screen.

10. The system according to claim 8, further comprising:
    a third packer positioned above the second groundwater heat exchanger within the borehole; and
    a fourth packer positioned below the second groundwater heat exchanger within the borehole,
    wherein the third and fourth packers isolate the second groundwater flow within the borehole to a section of the borehole that is between the third and fourth packers.

11. The system according to claim 10, wherein the third and fourth packers isolate the second groundwater flow to the second aquifer and through the second groundwater heat exchanger.

12. A geothermal heat pump system comprising:
    a main heat exchanger configured to exchange heat between a ground loop flow and a heat distribution system;
    a borehole that extends in a vertical direction through first and second aquifers, which are displaced from each other in the vertical direction;
    a first ground loop comprising:
       a first groundwater heat exchanger contained within the borehole and the first aquifer and including heat exchange piping;
       a second groundwater heat exchanger contained within the borehole and the second aquifer and including heat exchange piping;
       ground loop pipes configured to deliver the ground loop flow to the heat exchange piping of the first and second groundwater heat exchangers, and return the ground loop flow from the heat exchange piping of the first and second groundwater heat exchangers to the main heat exchanger;
    a first pump located in the borehole configured to drive a first groundwater flow in the borehole in a horizontal direction that is transverse to the vertical direction across the heat exchange piping of the first groundwater heat exchanger; and
    a second pump located in the borehole configured to drive a second groundwater flow in the borehole in the horizontal direction across the heat exchange piping of the second groundwater heat exchanger, wherein heat exchange occurs between the ground loop flow within the heat exchange piping of the first groundwater heat exchanger and the first groundwater flow and between the ground loop flow within the heat exchange piping of the second groundwater heat exchanger and the second groundwater flow.

13. The system according to claim 12, wherein the borehole comprises:
a sealed wall section that blocks the groundwater flow into the borehole;
a first permeable wall section located within the first aquifer;
a second permeable wall section located within the first aquifer on an opposing side of the borehole from the first permeable wall section and displaced from the first permeable wall section in the horizontal direction;
a third permeable wall section located within the second aquifer; and
a fourth permeable wall section located within the second aquifer on an opposing side of the borehole from the third permeable wall section and displaced from the third permeable wall section in the horizontal direction,
wherein:
the first pump drives the first groundwater flow into the borehole through the first permeable wall section and out of the borehole through the second permeable wall section; and
the second pump drives the second groundwater flow into the borehole through the third permeable wall section and out of the borehole through the fourth permeable wall section.

14. The system according to claim 13, wherein the, first, second, third and fourth permeable wall sections each include a screen.

15. The system according to claim 13, further comprising:
a first packer positioned above the first groundwater heat exchanger within the borehole;
a second packer positioned below the first groundwater heat exchanger within the borehole;
a third packer positioned above the second groundwater heat exchanger within the borehole; and
a fourth packer positioned below the second groundwater heat exchanger within the borehole,
wherein:
the first and second packers isolate the first groundwater flow within the borehole to a section of the borehole that is between the first and second packers; and
the third and fourth packers isolate the second groundwater flow within the borehole to a section of the borehole that is between the third and fourth packers.

16. The system according to claim 15, wherein:
the first and second packers isolate the first groundwater flow to the first aquifer and through the first groundwater heat exchanger; and
the third and fourth packers isolate the second groundwater flow to the second aquifer and through the second groundwater heat exchanger.

17. A method of exchanging heat using a geothermal heat pump system comprising:
delivering a ground loop fluid flow through heat exchange piping of a first groundwater heat exchanger positioned within a first aquifer and a borehole that extends in a vertical direction through the first aquifer;
driving a first groundwater flow in the borehole in a horizontal direction that is transverse to the vertical direction across the heat exchange piping of the first groundwater heat exchanger using a first pump located in the borehole; and
transferring heat between the first groundwater flow and the ground loop fluid flow at the heat exchange piping of the first groundwater heat exchanger.

18. The method according to claim 17, wherein:
the borehole comprises:
a sealed wall section that blocks the groundwater flow into the borehole;
a first permeable wall section located within the first aquifer; and
a second permeable wall section located within the first aquifer on an opposing side of the borehole from the first permeable wall section and displaced from the first permeable wall section in the horizontal direction; and
driving the first groundwater flow comprises driving the first groundwater flow into the borehole through the first permeable wall section and out of the borehole through the second permeable wall section.

19. The method according to claim 17, further comprising:
delivering the ground loop fluid flow through heat exchange piping of a second groundwater heat exchanger positioned in the borehole at a location that is displaced from the first groundwater heat exchanger in the vertical direction and in a second aquifer;
driving a second groundwater flow in the borehole in the horizontal direction across the heat exchange piping of the second groundwater heat exchanger using a second pump located in the borehole;
transferring heat between the second groundwater flow and the ground loop fluid flow at the heat exchange piping of the second groundwater heat exchanger.

20. The method according to claim 19, wherein:
the borehole comprises:
a sealed wall section that blocks the groundwater flow into the borehole;
a first permeable wall section located within the first aquifer; and
a second permeable wall section located within the first aquifer on an opposing side of the borehole from the first permeable wall section and displaced from the first permeable wall section in the horizontal direction;
a third permeable wall section located within the second aquifer; and
a fourth permeable wall section located within the second aquifer on an opposing side of the borehole from the third permeable wall section and displaced from the third permeable wall section in the horizontal direction;
driving the first groundwater flow comprises driving the first groundwater flow into the borehole through the first permeable wall section and out of the borehole through the second permeable wall section; and
driving the second groundwater flow comprises driving the second groundwater flow into the borehole through the third permeable wall section and out of the borehole through the fourth permeable wall section.

21. A geothermal heat pump system comprising:
a main heat exchanger configured to exchange heat between a ground loop flow and a heat distribution system;
a borehole that extends in a vertical direction through an aquifer;

a ground loop comprising:
  a groundwater heat exchanger contained within the borehole and including heat exchange piping;
  an input pipe configured to deliver the ground loop flow from the main heat exchanger to the heat exchange piping; and
  an output pipe configured to deliver the ground loop flow from the heat exchange piping to the main heat exchanger; and
a pump located in the borehole and configured to drive a groundwater flow in the borehole in a horizontal direction that is transverse to the vertical direction across the heat exchange piping,
wherein heat exchange occurs between the ground loop flow within the heat exchange piping and the groundwater flow, and
wherein:
  the borehole penetrates the aquifer, and the groundwater heat exchanger is positioned within the aquifer;
  the borehole comprises:
    a sealed wall section that blocks the groundwater flow into the borehole;
    a first permeable wall section located within the aquifer; and
    a second permeable wall section located within the aquifer on an opposing side of the borehole from the first permeable wall section and displaced from the first permeable wall section in the horizontal direction,
    wherein the pump drives the groundwater flow into the borehole through the first permeable wall section and out of the borehole through the second permeable wall section;
  the system further comprises:
    a first packer positioned above the groundwater heat exchanger within the borehole; and
    a second packer positioned below the groundwater heat exchanger within the borehole,
    wherein the first and second packers isolate the groundwater flow in the borehole to a section of the borehole that is between the first and second packers;
  the first and second packers isolate the groundwater flow to the aquifer and through the groundwater heat exchanger;
  the groundwater heat exchanger is a first groundwater heat exchanger;
  the aquifer is a first aquifer located at a first zone of the borehole;
  the pump is a first pump;
  the groundwater flow is a first groundwater flow; and
  the system further comprises:
    a second groundwater heat exchanger including heat exchange piping that receives the ground loop flow and positioned within a second aquifer located at a second zone of the borehole that is displaced in the vertical direction from the first aquifer; and
    a second pump configured to drive a second groundwater flow in the horizontal direction across the heat exchange piping of the second groundwater heat exchanger,
    wherein heat exchange occurs between the ground loop flow within the heat exchange piping of the second groundwater heat exchanger and the second groundwater flow.

* * * * *